B. G. LAMME.
METHOD OF OPERATING POLYPHASE INDUCTION MOTORS.
APPLICATION FILED JULY 6, 1908.
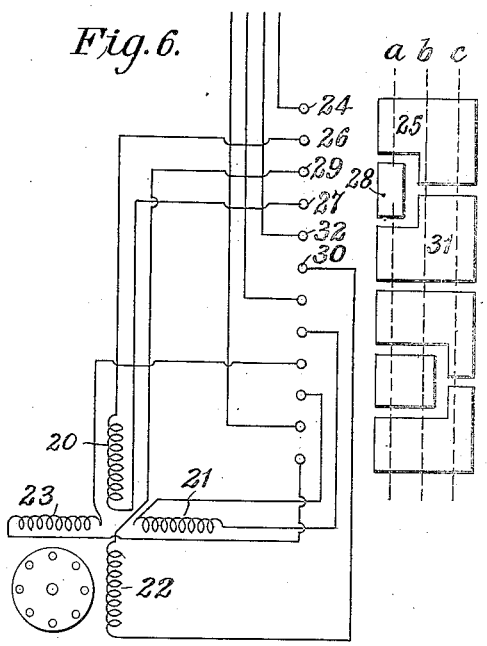
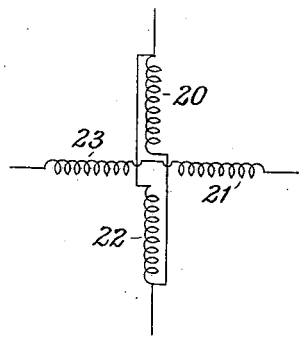
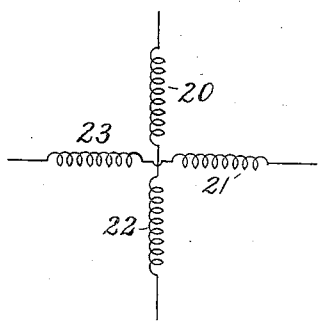
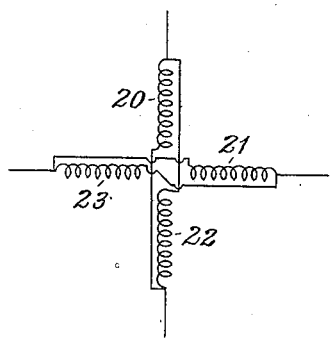
WITNESSES:
C. L. Belcher
Otto S. Schairer
INVENTOR
Benjamin G. Lamme
BY
Wesley G. Carr
ATTORNEY

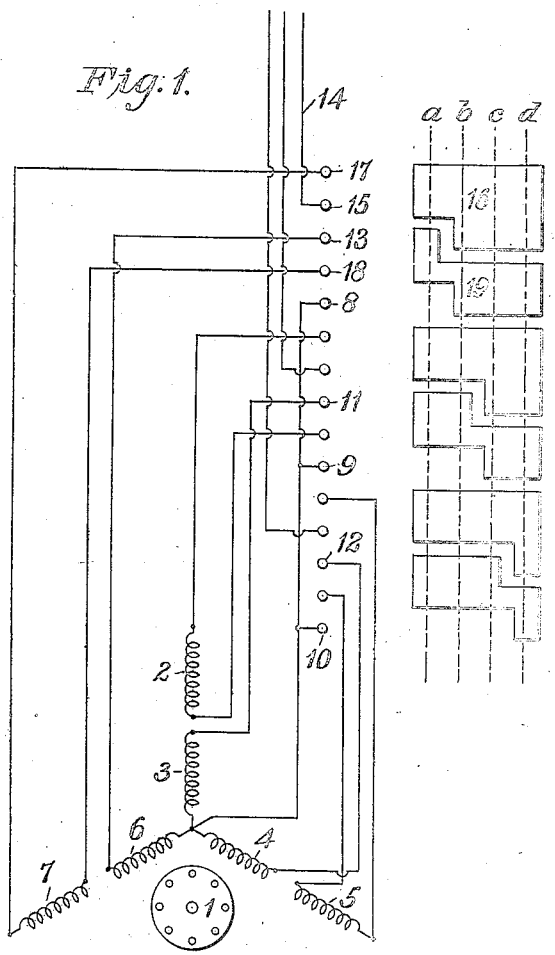

UNITED STATES PATENT OFFICE.

BENJAMIN G. LAMME, OF PITTSBURGH, PENNSYLVANIA, ASSIGNOR, BY MESNE ASSIGNMENTS, TO WESTINGHOUSE ELECTRIC & MANUFACTURING COMPANY, OF EAST PITTSBURGH, PENNSYLVANIA, A CORPORATION OF PENNSYLVANIA.

METHOD OF OPERATING POLYPHASE INDUCTION-MOTORS.

1,123,321.   Specification of Letters Patent.   Patented Jan. 5, 1915.

Application filed July 6, 1908. Serial No. 442,220.

*To all whom it may concern:*

Be it known that I, BENJAMIN G. LAMME, a citizen of the United States, and a resident of Pittsburgh, in the county of Allegheny and State of Pennsylvania, have invented a new and useful Improvement in Methods of Operating Polyphase Induction-Motors, of which the following is a specification.

My invention relates to induction motors, and it has for its object to provide a method of and a means for starting or operating polyphase induction motors that obviate the necessity for employing auto-transformers in connection therewith.

Figure 1 of the accompanying drawings is a diagrammatic view of a three-phase motor and a controller embodying my invention. Figs. 2, 3, 4 and 5 illustrate, diagrammatically, the arrangements of the motor windings for the various positions of the controller of Fig. 1. Fig. 6 is a diagrammatic view of a two-phase motor and a controller embodying the invention, and Figs. 7, 8 and 9 illustrate, diagrammatically, the connections of the motor windings for the various positions of the controller of Fig. 6.

The motor comprises a secondary member 1 of the "squirrel-cage" or any other suitable type, and a primary winding divided into six section 2, 3, 4, 5, 6 and 7, two for each phase. The sections 3, 4 and 6 of the primary winding are permanently connected in star arrangement, the common terminal or neutral point of the winding being connected to three stationary contact fingers 8, 9 and 10 of the controller, and the other terminals of the said sections being connected to the contact terminals 11, 12 and 13, respectively, of the controller. The remaining sections 2, 5 and 7 of the primary winding of the motor are connected, respectively, between different pairs of contact fingers of the controller in such a manner that when the controller segments engage the contact fingers along the broken line *a*, the two sections of each phase of the winding will be connected in series relation, as indicated in Fig. 2. This will be readily understood by following the circuit for one phase of the winding from a supply conductor 14 through devices bearing reference characters 15, 16, 17, 7, 18, 19, 13 and 6, the circuits for the remaining phases being similar.

As the controller is moved to the position indicated by the broken line *b*, the sections 6 and 7 of one phase of the winding are changed from series to parallel relation, as shown in Fig. 3, the two parallel circuits being respectively by way of devices bearing reference characters 14, 15, 16, 17, 7, 18, 19 and 8, and by way of devices 14, 15, 16, 13 and 6. As the controller is moved through the succeeding positions *c* and *d* of the controller, the sections of the remaining two phases of the primary winding are changed in succession from series to parallel relation, the circuits being similar to those just described.

When the sections of each phase of the winding are arranged in series relation, as shown in Fig. 2, the torque exerted is approximately 25% of the normal torque of the motor, or that obtained with the connections shown in Fig. 5, since the arrangement is equivalent to applying one-half of normal voltage of the motor. With the winding arranged as shown in Fig. 3, the torque exerted is from 35 to 40% of that exerted when the sections of the windings are connected as shown in Fig. 5, and with the arrangement shown in Fig. 4, a torque of from 65 to 70% of normal full load torque is obtained. While some unbalancing of the currents in the several phases of the winding occurs when the unsymmetrical arrangements shown in Figs. 3 and 4 are employed, but little harmful effect upon the torque is caused, as it is known that the torques, with these arrangements, are approximately the same per kilovolt-ampere input to the motor as if balanced conditions existed.

In certain or many instances it may be unnecessary to provide for as many gradations in the starting torque as are arranged for in Fig. 1, and for that reason one or the other of the connections illustrated in Figs. 3 and 4 may be omitted.

In Fig. 6, the invention is shown as applied to a two-phase motor having its primary winding divided into four sections 20, 21, 22 and 23, two for each phase, the windings being connected, respectively, between different pairs of contact terminals of the controller. In the first position of the controller, which is indicated by the broken line *a*, the two sections of each phase of the primary winding of the motor are connected in series relation, the circuit for one phase being by way of devices bearing reference characters 24, 25, 26, 20, 27, 28, 29, 22, 30, 31 and 32, and the circuit of the other phase of the winding being similar thereto. In position *b* of the controller, sections 20 and 22 of one phase of the winding are connected in parallel relation, as shown in Fig. 8, the two parallel circuits being, respectively, by way of devices bearing reference characters 24, 25, 26, 20, 27, 31 and 32, and by way of devices 24, 25, 29, 22, 30, 31 and 32. In position *c* of the controller, the sections 21 and 23 of the other phase of the winding are also connected in parallel relation, the circuits being similar to those just described for position *b*.

I claim as my invention:

1. The method of starting a polyphase induction motor having a primary winding comprising a plurality of sections for each phase of current which consists in first making a supply-circuit connection for each phase of current, with the sections corresponding to a plurality of phases connected in series relation, and then successively connecting the sections corresponding to the respective phases in parallel relation.

2. The method of starting a polyphase induction motor having a primary winding comprising a plurality of sections corresponding to each phase of current which consists in first connecting the sections corresponding to each of the phases in series relation and then successively connecting the sections corresponding to the respective phases in parallel relation to gradually reduce the resistance to current flow in the winding and to permit an increase in the torque exerted by the motor.

3. The method of operating a polyphase induction motor having a primary winding comprising a plurality of sections for each phase of current which consists in changing the sections corresponding to a plurality of phases successively from series to parallel or from parallel to series relation and thus adjusting the resistance to current flow in the motor and the torque exerted thereby.

4. The method of operating a polyphase induction motor having a star-connected primary winding comprising a plurality of sections for each phase of current which consists in first connecting the sections corresponding to the several phases in series relation and then successively changing the sections corresponding to a plurality of phases to parallel relation.

5. The method of operating a polyphase induction motor having a star-connected primary winding comprising a plurality of sections for each phase of current which consists in connecting the sections pertaining to each phase in series relation and then successively connecting the different phase sections in parallel relation.

In testimony whereof, I have hereunto subscribed my name this 30th day of June, 1908.

BENJ. G. LAMME.

Witnesses:
ELIZABETH LIVINGSTONE,
BIRNEY HINES.